March 26, 1929.  C. J. SEILS  1,706,634
ARM REST DEVICE
Filed March 15, 1928  2 Sheets-Sheet 1
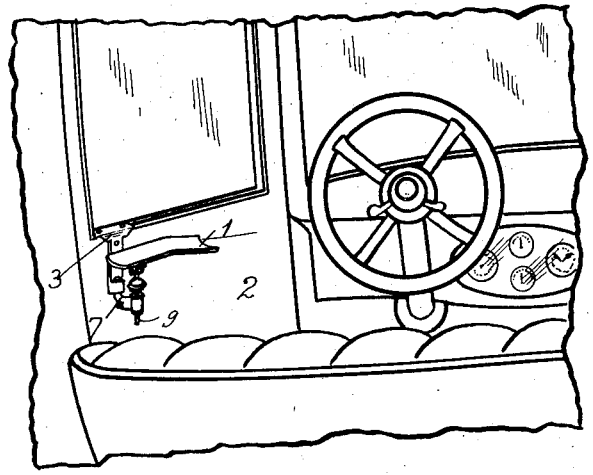
Fig. 1.
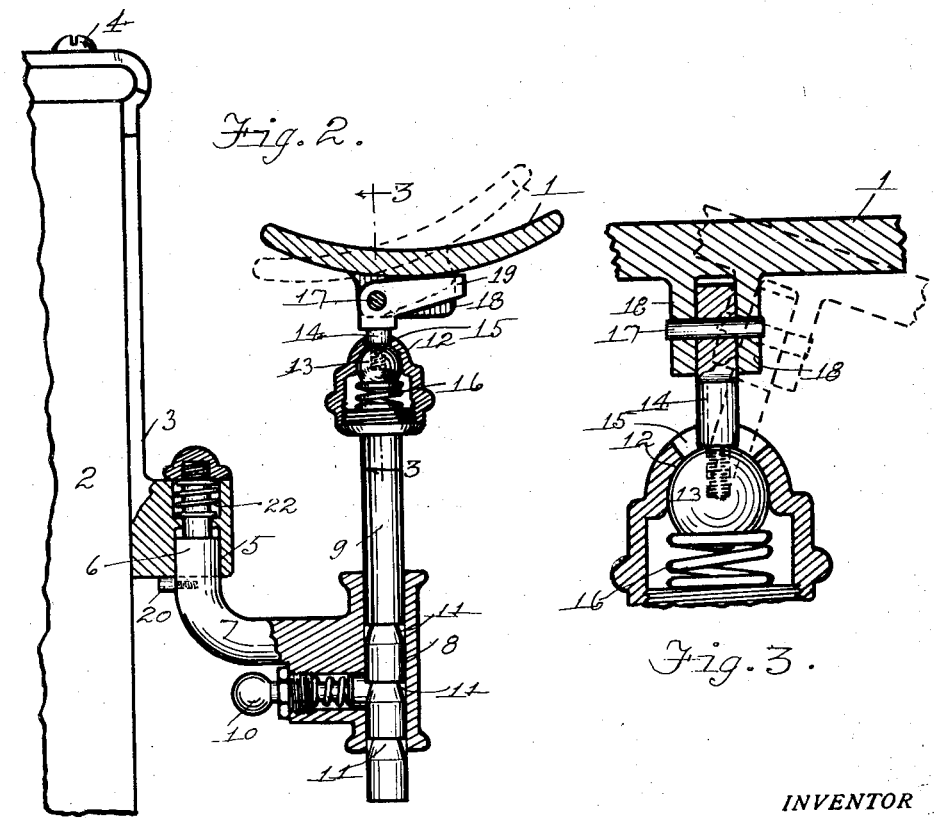
Fig. 2.
Fig. 3.
Witness.
INVENTOR
Christian J. Seils
BY Cyrus W. Rice
ATTORNEY March 26, 1929.  C. J. SEILS  1,706,634
ARM REST DEVICE
Filed March 15, 1928   2 Sheets-Sheet 2
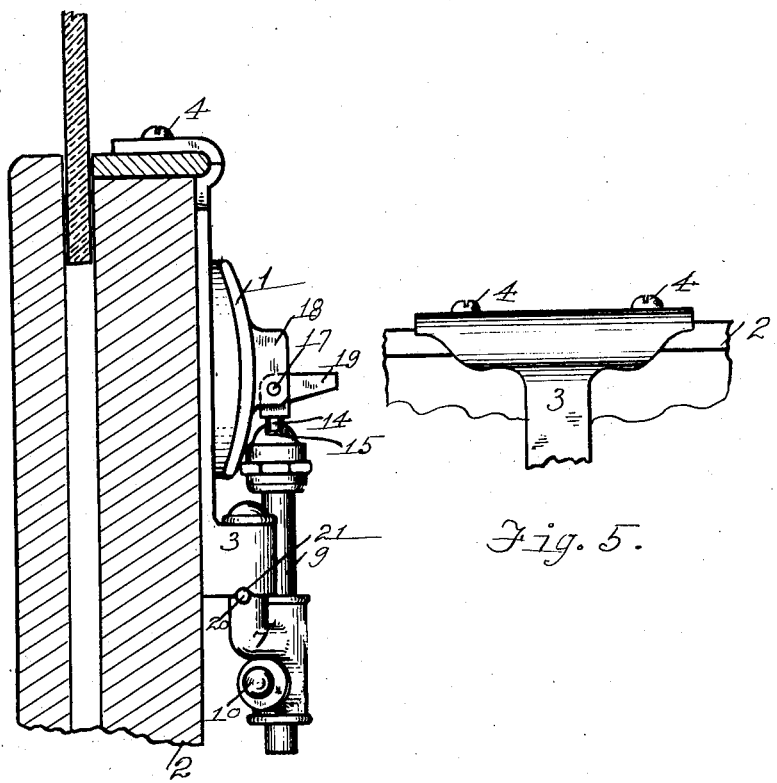
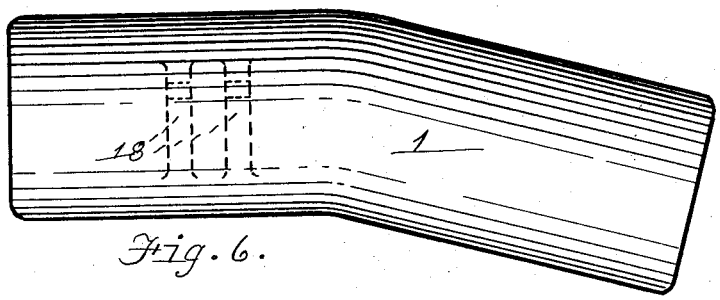
INVENTOR
Christian J. Seils
BY Cyrus W. Rice
ATTORNEY
Witness.

Patented Mar. 26, 1929.

1,706,634

UNITED STATES PATENT OFFICE.

CHRISTIAN J. SEILS, OF COLDWATER, MICHIGAN.

ARM-REST DEVICE.

Application filed March 15, 1928. Serial No. 261,774.

The present invention relates to arm rests; and its object is, generally, to provide an improved device adapted to be applied to an automobile for the purpose of supporting an arm of the driver thereof; and further, to provide such a device having improved means for adjusting it to the needs and convenience of the driver; and further, to provide improved means whereby the device may automatically adapt itself and its various parts to the driver's movements in guiding the automobile; and further, to provide such a device which may be readily moved to a compact position when not in use.

These and any other objects hereinafter appearing are attained by, and the invention finds preferable embodiment in, the structure hereinafter particularly described in the body of this specification and illustrated by the accompanying drawings, in which:—

Figure 1 is a view in perspective of the forward portion of the interior of an automobile to which my arm rest device is applied;

Figure 2 is a rear view of the device, certain parts being shown in central vertical section;

Figure 3 is a view of portions of the same, certain parts being shown in section taken on line 3—3 of Figure 2;

Figure 4 is a rear view of the device in folded or unused position;

Figure 5 is a face view of the upper portion of the mounting means for the device; and Figure 6 is a top plan view of the arm-supporting member thereof.

The arms of drivers of automobiles are liable to become weary after a long drive; and it is the object of this invention to minimize this by supporting the driver's arm in a resting position.

In Figure 1 my device is shown applied to the interior of the left-hand side of an automobile, in a position to support the driver's left arm. The arm-supporting member or arm rest itself of my device is a plate 1 which is in approximately horizontal position when in use as seen in Figures 1 and 2, with its slightly concave side upward. This member 1 is carried on the inner side of the left hand wall or door 2 of the automobile and by the following means: a base member 3 is secured as by screws 4 to the automobile and has a vertical bearing 5 in which turns the journal portion 6 of an arm 7 having at its free end a vertical bearing 8 in which an elongated member—the rod 9—turns and is adjustably held in desired vertical position by the spring latch 10 engaging in any of the annular recesses 11 of this rod. The said elongated member 9 carries at its upper end the socket 12 of a ball and socket joint, such socket being open below to receive the ball 13 of said joint, this ball being formed on the lower end of the elongated element 14 projecting upwardly through the slot 15 in said socket, such slot extending in the longitudinal direction of the automobile. A coiled spring 16 presses this ball upwardly into the socket, and yieldingly resists or cushions the downward movement of the ball and said element 14. On the upper end of this element 14 the arm rest 1 is turnably mounted, a pivot pin 17 passing through the downwardly extending lugs 18 of the arm rest 1 and the upper end of said element 14. When in the position of use (shown in Figure 1 and in solid lines in Figure 2) the arm rest 1 is held against turning in one direction about the pivot pin 17 by a stop arm 19 of the element 14; but when the device is not in use, the arm rest may be turned about said pivot and away from said stop, and the arm 7 may be swung toward the wall or door 2 of the automobile, to position the device closely to said wall as shown in Figure 4. The device is yieldingly held in this position of nonuse by the lug 20 of the arm 7 seating in the recess 21 of the base 3 and yieldingly held therein by the spring 22.

It will be seen that this device is thus not only capable of being readily changed to and from a position of use, but when in such position it is readily adjustable to the needs and convenience of the particular driver, and having been thus adjusted, adapts itself to his movements in driving.

The arm rest 1 may be vertically positioned as may be desired by sliding the rod, or elongated member 9 up or down, in which position the arm rest is held by the latch 10; said arm rest may be turned in a horizontal plane about the axis of the shank of the elongated element 14; the arm rest is cushioned in its downward movement by the spring 16 pressing the ball 13 upwardly in the open socket 12; the arm rest may be turned or tilted in a vertical plane extending in the automobile's longitudinal direction by reason of the sliding movement of said element 14 in the slot 15, in which movement said element is guided by the sides of the slot; furthermore, the arm rest may be tilted about the pivot pin 17 as seen in dotted lines in Figure 2 but is held from oppositely tilting by the stop 19.

The invention being intended to be pointed out in the claims, is not to be limited to or by details of construction of the particular embodiment thereof illustrated by the drawings or hereinbefore described.

I claim:

1. A device of the class described comprising a base member adapted to be mounted on an automobile door, a vertically disposed bearing on said base member, an arm having one end pivotally mounted in said bearing and the other end thereof extending transversely and horizontally swingable with respect thereto, a vertically disposed bearing on said swingable arm end, an elongated shank member rotatably and axially slidable in said arm bearing, a plate adapted to serve as an arm rest and joint members between said plate and said shank for permitting said arm rest plate to be rocked relatively to said shank.

2. A device of the class described comprising a base member adapted to be mounted on an automobile door, a vertically disposed bearing on said base member, an arm having one end pivotally mounted in said bearing and the other end thereof extending transversely and horizontally swingable with respect thereto, a vertically disposed bearing on said swingable arm end, an elongated shank member rotatably and axially slidable in said arm bearing, a plate adapted to serve as an arm rest and joint members between said plate and said shank for permitting said arm rest plate to be rocked in more than one plane relatively to said shank.

3. A device of the class described comprising a base member adapted to be mounted on an automobile door, a vertically disposed bearing on said base member, an arm having one end pivotally mounted in said bearing and the other end thereof extending transversely and horizontally swingable with respect thereto, a vertically disposed bearing on said swingable arm end, an elongated shank member rotatably and axially slidable in said arm bearing, a plate adapted to serve as an arm rest, a member pivotally mounted on the under side of said plate and joint members between said pivotally mounted member and said shank for permitting said arm rest plate to be rocked relatively to said shank.

4. A device of the class described comprising a base member adapted to be mounted on an automobile door, a vertically disposed bearing on said base member, an arm having one end pivotally mounted in said bearing and the other end thereof extending transversely and horizontally swingable with respect thereto, a vertically disposed bearing on said swingable arm end, an elongated shank member rotatably and axially slidable in said arm bearing, a plate adapted to serve as an arm rest, a member pivotally mounted on the under side of said plate and a ball and socket joint between said pivotally mounted member and said shank for permitting said arm rest plate to be rocked relatively to said shank.

In testimony whereof I have hereunto set my hand at Columbus, Ohio, this 9th day of March, 1928.

CHRISTIAN J. SEILS.